United States Patent
Wu et al.

(10) Patent No.: US 10,789,342 B2
(45) Date of Patent: Sep. 29, 2020

(54) STORAGE DEVICE WITH BIOMETRIC MODULE

(71) Applicants: INVENTEC (PUDONG) TECHNOLOGY CORPORATION, Shanghai (CN); INVENTEC CORPORATION, Taipei (TW)

(72) Inventors: Cheng-Yu Wu, Taipei (TW); Ming-Yuan Liu, Taipei (TW)

(73) Assignees: INVENTEC (PUDONG) TECHNOLOGY CORPORATION, Shanghai (CN); INVENTEC CORPORATION, Tiapei (TW)

( * ) Notice: Subject to any disclaimer, the term of this patent is extended or adjusted under 35 U.S.C. 154(b) by 275 days.

(21) Appl. No.: 15/976,749

(22) Filed: May 10, 2018

(65) Prior Publication Data
US 2019/0080067 A1    Mar. 14, 2019

(30) Foreign Application Priority Data
Sep. 11, 2017   (CN) .......................... 2017 1 0812375

(51) Int. Cl.
*G06F 21/32* (2013.01)
(52) U.S. Cl.
CPC .................................. *G06F 21/32* (2013.01)
(58) Field of Classification Search
CPC ....................................................... G06F 21/32
See application file for complete search history.

(56) References Cited

U.S. PATENT DOCUMENTS

| | | | | |
|---|---|---|---|---|
| 7,222,360 | B1* | 5/2007 | Miller ..................... | G06F 21/32 709/225 |
| 2002/0077992 | A1* | 6/2002 | Tobin ..................... | G06Q 20/02 705/65 |
| 2002/0095608 | A1* | 7/2002 | Slevin ..................... | G06F 21/32 726/5 |
| 2002/0178367 | A1* | 11/2002 | Hamid ..................... | G06F 21/32 713/186 |
| 2004/0005087 | A1* | 1/2004 | Hillhouse ............... | G06F 21/32 382/125 |
| 2004/0025031 | A1* | 2/2004 | Ooi ......................... | G06F 21/78 713/186 |
| 2004/0041019 | A1* | 3/2004 | Schneider ............... | G06F 21/34 235/382 |
| 2007/0132733 | A1* | 6/2007 | Ram ................... | G06F 3/03543 345/163 |

(Continued)

*Primary Examiner* — Aravind K Moorthy
(74) *Attorney, Agent, or Firm* — Maschoff Brennan

(57) ABSTRACT

A storage device with a biometric module comprises a hub module, a first external transmission module, a biometric module, a control module and a storage module. The hub module comprises an external connection port and a plurality of internal connection ports. The first external transmission module electrically connects to the external connection port. The biometric module electrically connects to one of the internal connection ports. The control module electrically connects to an unoccupied one of the internal connection ports, and the control module is configured to obtain a permission signal and generate an access signal accordingly, the permission signal is associated with a biometric identification signal and a biometric comparison information. The storage module electrically connects to the control module. The storage module comprises a public area and a private area. The control module can access the private area when receiving the permission signal.

7 Claims, 4 Drawing Sheets

(56) References Cited

U.S. PATENT DOCUMENTS

| | | | |
|---|---|---|---|
| 2007/0234065 A1* | 10/2007 | Dufour | G06Q 20/32 713/186 |
| 2008/0224875 A1* | 9/2008 | Phillips | G06K 7/10316 340/572.8 |
| 2008/0270780 A1* | 10/2008 | Lopez | G06F 13/385 713/1 |
| 2010/0057744 A1* | 3/2010 | Lock | G06F 9/54 707/E17.032 |
| 2010/0253470 A1* | 10/2010 | Burke | H04L 9/302 340/5.82 |
| 2011/0037564 A1* | 2/2011 | Wong | H04L 63/0861 340/5.83 |
| 2011/0072503 A1* | 3/2011 | Tan | G06F 21/35 726/9 |
| 2011/0289178 A1* | 11/2011 | Ittah | G06F 21/79 709/213 |
| 2011/0314296 A1* | 12/2011 | Dolgunov | G06F 21/31 713/185 |
| 2012/0030752 A1* | 2/2012 | Bruno | G06F 21/32 726/16 |
| 2012/0188104 A1* | 7/2012 | Choi | G06Q 10/083 340/989 |
| 2013/0301886 A1* | 11/2013 | Koda | G06K 9/00255 382/118 |
| 2014/0244512 A1* | 8/2014 | Liesenfelt | G06F 21/32 705/51 |
| 2015/0178478 A1* | 6/2015 | Kocher | G06F 21/10 726/26 |
| 2015/0317488 A1* | 11/2015 | Dogu | G06F 21/62 713/165 |
| 2016/0019548 A1* | 1/2016 | Gangi | G06F 21/32 705/72 |
| 2016/0269403 A1* | 9/2016 | Koutenaei | H04L 63/0861 |
| 2016/0321441 A1* | 11/2016 | Tonoyan | G06F 21/32 |
| 2017/0104597 A1* | 4/2017 | Negi | H04L 9/0816 |
| 2017/0279799 A1* | 9/2017 | Baltzer | H04L 63/0861 |
| 2018/0020349 A1* | 1/2018 | Tyagi | H04L 63/083 |
| 2020/0089859 A1* | 3/2020 | Guan | G06F 21/32 |

\* cited by examiner

STORAGE DEVICE WITH BIOMETRIC MODULE

CROSS-REFERENCE TO RELATED APPLICATIONS

This non-provisional application claims priority under 35 U.S.C. § 119(a) on Patent Application No(s). 201710812375.1 filed in China on Sep. 11, 2017, the entire contents of which are hereby incorporated by reference.

TECHNICAL FIELD

This disclosure relates to a storage device, particularly to the storage device with a biometric module.

RELATED ART

Flash memory is commonly used in storage devices such as flash drives and memory cards. These storage devices allow users to exchange data between computers and digital products. Generally, the external connecting interface of flash drives adopts the USB (Universal Serial Bus). From the perspective of stability, without the mechanical reading/writing component, the flash drive avoids the damage of the storage data due to crash or falling. From the perspective of portability, the flash drive is lightweight with small size, so it is easy to carry. In addition, the flash drive supports hot plugging by the USB interface, so a user does not need to install an additional driver when using the flash drive, therefore increasing the convenience of using the flash drive.

With the promotion of users' awareness of information security, it should pay more attention on the protection of private data. As a storage medium with great convenience, the flash drive with an encryption program installed is an early-stage protection strategy, and the user needs to enter the correct password for accessing the private data. However, the user may forget the password or the password itself may also be leaked. Under the consideration of the above situations, using the fingerprint as a unique biometric identifier was proposed to replace the password-protecting strategy. Some laptops have already adopted the fingerprint identification module for the operating system login. However, for a typical desktop computer, the user needs to insert a third-party dongle if he/she wants to experience the convenience of using his/her fingerprint to log in the operating system. This kind of dongle usually has only one single function, but it still occupies one USB port.

From the perspective of the producer who integrates the fingerprint identification component and flash memory, in the common architecture design, the fingerprint identification module is highly dependent upon the control module and the main job of the control module is to access the flash memory chip. Once the size or the process of the flash memory chip changes, the firmware running on the control module has to be adjusted accordingly.

SUMMARY

According to one or more embodiments of this disclosure, a storage device with a biometric module, comprising: a hub module with an external connection port and a plurality of internal connection ports; a first external transmission module electrically connecting to the external connection port, wherein types of transmission interfaces of the first external transmission module and the hub module are identical; a biometric module electrically connecting to one of the plurality of internal connection ports, wherein the biometric module is configured to perform biometric identification and to generate a biometric identification signal; a control module electrically connecting to an unoccupied one of the plurality of internal connection ports, wherein the control module is configured to obtain a permission signal and to generate an access signal accordingly, wherein the permission signal is associated with the biometric identification signal and a biometric comparison information; and a storage module electrically connecting to the control module, wherein the storage module comprises a public area and a private area, the control module sends the access signal directing toward the private area to the storage module when the control module receives the permission signal.

According to one or more embodiments of this disclosure, a login method for logging into an operating system by using a storage device with a biometric module, adapted to a computer with the operating system and a specified software installed therein, comprising: connecting to the computer by the storage device; checking whether the storage device connects to the computer by a detecting procedure of the operating system when the operating system shows a login indication, and requiring a biometric identification signal and a biometric comparison information from the storage device by the specified software when the storage device connects to the computer; executing a biometric comparison procedure by the operating system invoked by the specified software; and executing a login procedure when the biometric identification signal and the biometric comparison information are identical, and providing an error message by the operating system when the biometric identification signal and the biometric comparison information are different.

According to one or more embodiments of this disclosure, a private data accessing method for a storage device with a biometric module adapted to a computer with an operating system and a specified software installed therein, wherein the storage device comprises a public area and a private area, comprising: connecting to the computer by the storage device and logging in the operating system; performing an access operation to the private area; requiring a biometric identification signal and a biometric comparison information from the storage device by the specified software; executing a biometric comparison procedure by the operating system invoked by the specified software; and when the biometric identification signal and the biometric comparison information are identical, notifying the operating system by the biometric comparison procedure via the specified software for the operating system to send a permission signal to the storage device, and generating an access signal directing toward the private area according to the permission signal sent by a control module of the storage device; and providing an error message by the biometric comparison procedure when the biometric identification signal and the biometric comparison information are different.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
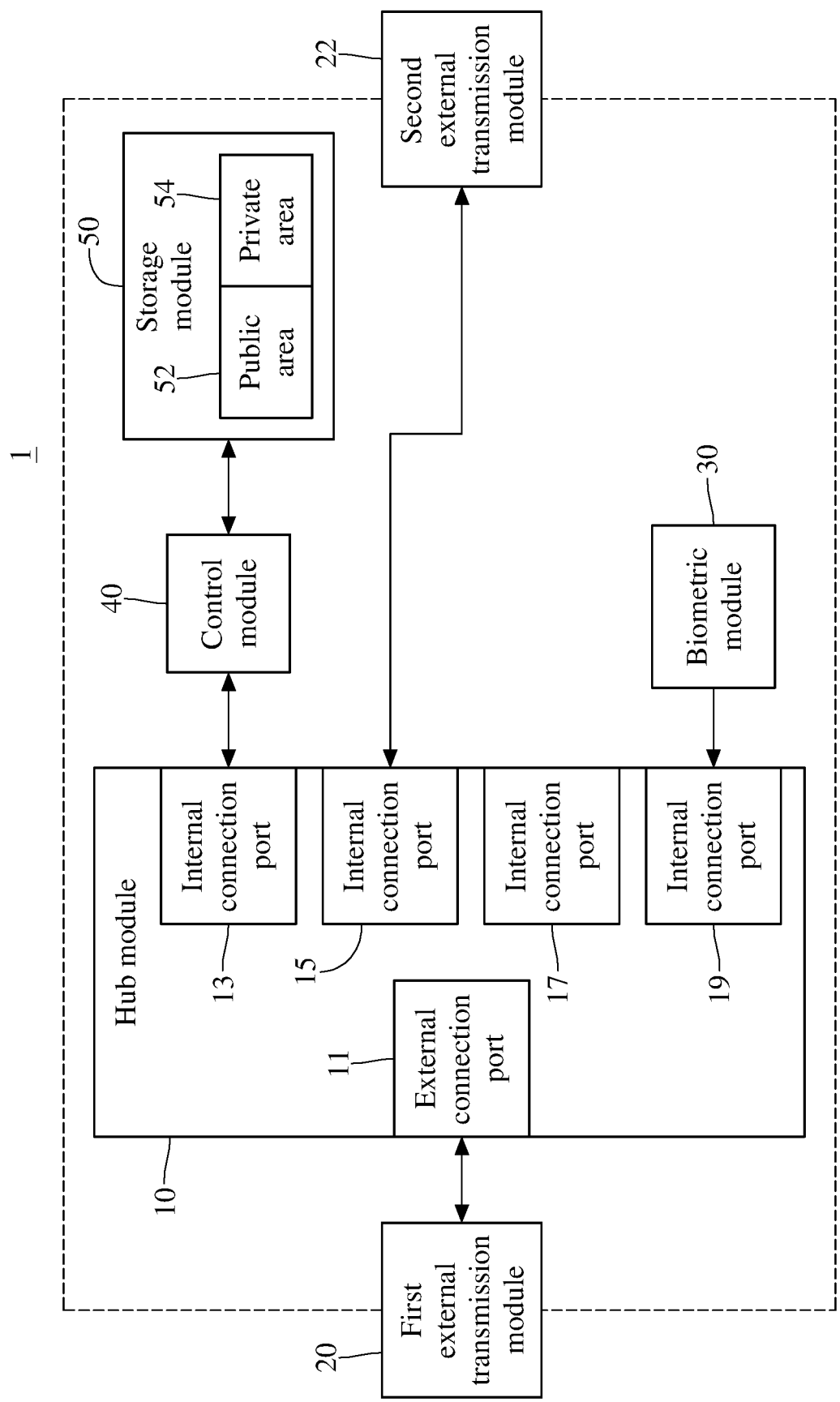
FIG. 1 is a schematic view of a storage device according to an embodiment of the present disclosure.

Please refer to FIG. 1, which is a schematic view of a storage device according to an embodiment of the present disclosure. The storage device 1 comprises a hub module 10, a first external transmission module 20, a biometric module 30, a control module 40 and a storage module 50.

The hub module 10 comprises an external connection port 11 and four internal connection ports, 13, 15, 17 and 19. The electronic signals from the external connection port 11 can be transmitted to one or some of the internal connection ports 13-19 through the hub module 10, and the electronic signals from the internal connection ports 13-19 can be transmitted to the external connection port 11 through the hub module 10. Practically, a small-sized control chip can be installed inside the hub module 10 to select which of the internal connection ports can be enabled for exchanging the data with the external connection port 11. In addition, the storage device 1 is connected to a computer for its usage, so the present disclosure comprises a first external transmission module 20 whose one end electronically connects to the external connection port 11 and another end electronically connects to a computer host's connection port. It should be noticed that the present disclosure does not limit the number of the internal connection ports 13-19.

Moreover, all the connection ports 11-19 of the hub module 10 follow the same transmission standard such as USB (Universal Serial Bus) in this embodiment, but the present disclosure does not limit the transmission standard.

Figure 2:
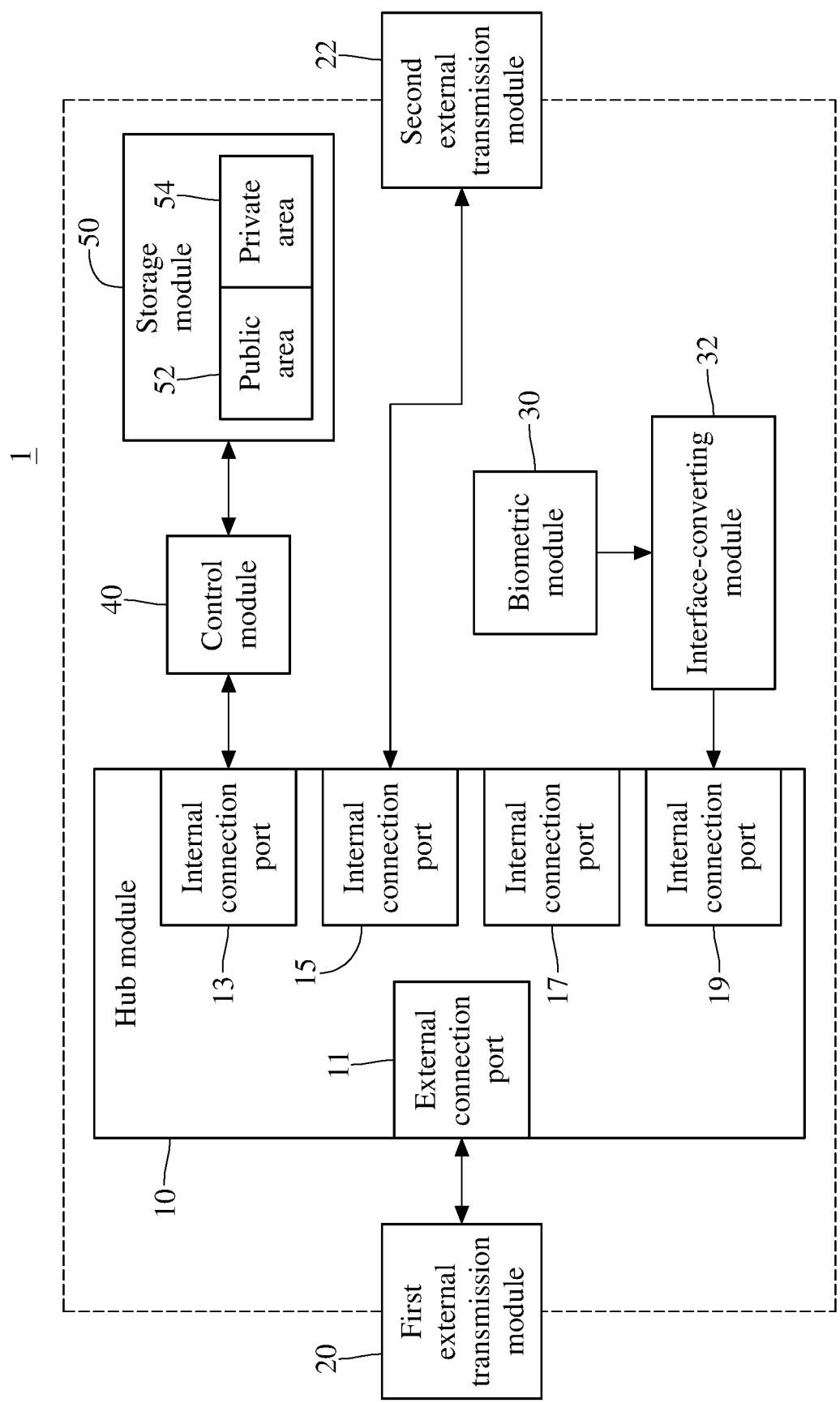
FIG. 2 is a schematic view of the storage device according to another embodiment of the present disclosure.

As shown in FIG. 1, the biometric module 30 electronically connects to the internal connection port 19 of the hub module 10, and the biometric module 30 has the same transmission interface as the hub module 10 in this embodiment. Please refer to FIG. 2. In another embodiment of the present disclosure, the biometric module 30 and the hub module 10 have different transmission interfaces. For example, the biometric module 30 adopts SPI (Serial Peripheral Interface) and the hub module 10 adopts USB, so the storage device 1 in another embodiment of the present disclosure further comprises an interface-converting module 32 configured to convert the SPI signals into USB signals. The biometric module 30 performs the biometric identification to get a biometric identification signal from a user. So-called biometric identification is based on one or some of the following features: fingerprint, face, voice, iris, vein, retina, signature and DNA. Practically, storage device 1 can adopt at least one biometric module 30 according to the application scenario, and the following embodiments of the present disclosure adopt "fingerprint" as a representative.

Please refer to FIG. 1. The control module 40 electrically connects to one of the unoccupied internal connection port 13 of the hub module 10. As shown in FIG. 1, the biometric module 30 electronically connects to the internal connection port 19 of the hub module 10, and the control module 40 electronically connects to the internal connection port 13 of the hub module 10. Therefore the control module 40 can receive a permission signal from the computer through the hub module 10, and the control module 49 also can receive the biometric identification signal from the biometric module 30 through the hub module 10. In practical, for example, the control module 40 is a MCU (Microprocessor Control Unit) or a SoC (System on Chip). The control module 40 transfers the access operations sent from the computer with high-level language into low-level hardware instructions by running a specified firmware on MCU or SoC.

Please refer to FIG. 1. In an embodiment of the present disclosure, the storage module 50 electronically connects to the control module 40. In other embodiments, if the storage module 50 has the same transmission interface as the hub module 10, the storage module 50 can also electronically connect to the hub module 10 and exchange data with the control module 40 through the hub module 10. Most of the storage module 50 is mainly divided into a public area 52 and a private area 54. The private area 54 can be further divided into a plurality of exclusive areas corresponding to a plurality of users, so the present disclosure does not limit the number of the private area 54. In general, after connecting the storage device 1 to the computer, the user can access the data stored in the public area 52 through the operating system running on the computer. Specifically, the control module 40 transfers an access operation sent from the operating system with high-level language into the access signal that can be recognized by the storage module 50, and said access signal directs toward the public area 52 only. On the other hand, when the operating system sends an access operation to the private area 54, the control module 40 has to get a permission signal additionally from the computer, and the control module 40 generates an access signal directing toward the private area 54 according to the permission signal. When receiving the permission signal directing to the private area 54, the storage module 50 inputs or outputs the data stored in the private area 54 according to the commands from the control module 40. Practically, for example, the storage module 50 is made by NAND flash, V-NAND flash or NOR flash; however, the present disclosure does not limit the hardware structure of the storage module 50.

In this embodiment of the present disclosure, the permission signal is generated in software manner by the operating system. In other embodiments, the permission signal can be generated in hardware manner by the control module 40. Basically, the permission signal is associated with the biometric identification signal and a biometric comparison information. Taking the fingerprint signal as an example of the biometric identification signal, the biometric module 30 scan the user's finger to generate a biometric identification signal when performing the biometric identification every time. In addition, when the storage device 1 is used by the user for the first time, the biometric module 30 scans the user's fingerprint and stores the scanned result into the biometric storage section of the storage module 50 in a form of the biometric comparison information. In other embodiments, the biometric comparison information can be stored in a memory component of the control module 40, the present disclosure does not limit the location of the biometric comparison information. It should be noticed that the biometric storage section is accessible only to the control module 40 for ensuring the safety of the original fingerprint information. The control module 40 receives the permission signal directing toward the private area 54 when the operating system adopts a software method (such as a feature detection procedure) to ensure that the biometric identification signal and the biometric comparison information are matched (such as both of them have identical feature points).

Please refer to FIG. 1. In an embodiment of the present disclosure, the storage device 1 further comprises a second external transmission module 22. The second external transmission module 22 has at least two transmission interfaces, one of which electronically connects to another unoccupied internal connection port 15 of the hub module 10, and another transmission interface is configured to connect to an external device. The second external transmission module 22 and the hub module 10 have identical type of the transmission interface. The second external transmission module 22 improves the scalability of the storage device 1 of the present disclosure. For example, an extra device with an USB interface can be electronically connected to an USB port outside of the second external transmission module 22 to make the best use of the serial connection feature of USB.

Figure 3:
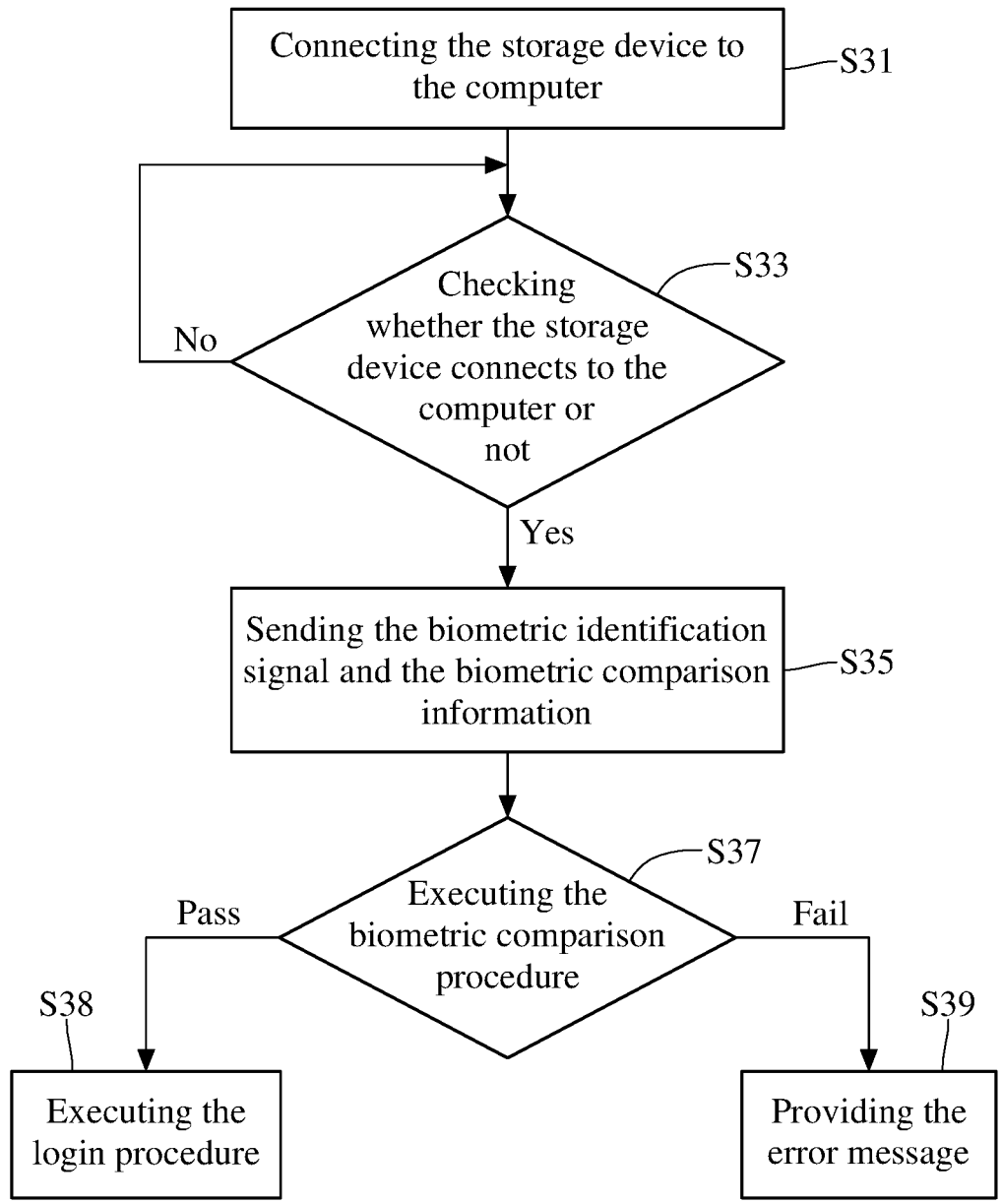
FIG. 3 is a flowchart of a login method for logging in an operating system according to an embodiment of the present disclosure.

Please refer to FIG. 3, which shows a flowchart of a login method for logging in an operating system by using the storage device 1 according to an embodiment of the present disclosure, adapted to a computer with the operating system and a specified software installed therein, wherein said operating system is such as Microsoft Windows operating system. Please refer to the step S31. Specifically, the storage device 1 connects to the USB port of the computer through the first external transmission module 20. Please refer to the step S33. After the user powers on the computer and then the computer shows a login indication, the operating system automatically performs a detecting procedure to determine whether the storage device 1 connects to the computer or not. If the operating system ensures that the storage device 1 of the present disclosure has connected to the computer, moving forward to the step S35; otherwise, moving backward to the step S33, which means that the operating system continues to perform the detecting procedure if any storage device 1 connects to the computer, and after the detecting procedure finished, the user has to enter the account and the password to login the operating system.

In the step S35, a specified software such as AP Tool installed in the computer asks the storage device 1 to send the biometric identification signal and the biometric comparison information. The biometric identification signal is generated by scanning the user's finger with a scanning component of the biometric module 30. The biometric comparison information is obtained from the biometric storage section of the storage module 50 by the control module 40. It should be noticed that only the AP Tool can ask the control module 40 to get the biometric comparison information from the biometric storage section, and this is for the safety of the fingerprint original information.

Please refer to the step S37 in FIG. 3. The specified software invokes the operating system for executing the biometric comparison procedure. Taking the Windows operating system as an example, Microsoft has added a set of services and interfaces called WBF (Windows Biometric Framework) in the Windows operating systems after the Windows Server 2008 R2, wherein the Windows Biometric Service, which is part of the WBF, gives client applications the ability to capture, compare, manipulate, and store biometric data. So-called biometric data are such as the biometric identification signal generated by the biometric module 30 and the biometric comparison information stored in biometric storage section of the storage module 50. The control module 40 sends the biometric identification signal and the biometric comparison information to the operating system through the hub module 10 and the first external transmission module 20, and then the AP Tool invokes the biometric comparison procedure in the WBF to determine whether the biometric identification signal is identical to the biometric comparison information. If the comparison passes, (means that the above two data are the same), the biometric comparison procedure notifies the operating system to execute a login procedure, as shown in the step S38. If the comparison fails (means that the above two data are different), the biometric comparison procedure notifies the operating system to provide an error message to the user, as shown in the step S39, so that the user can decide to use the fingerprint identification to log in again or use the password to log in.

Figure 4:
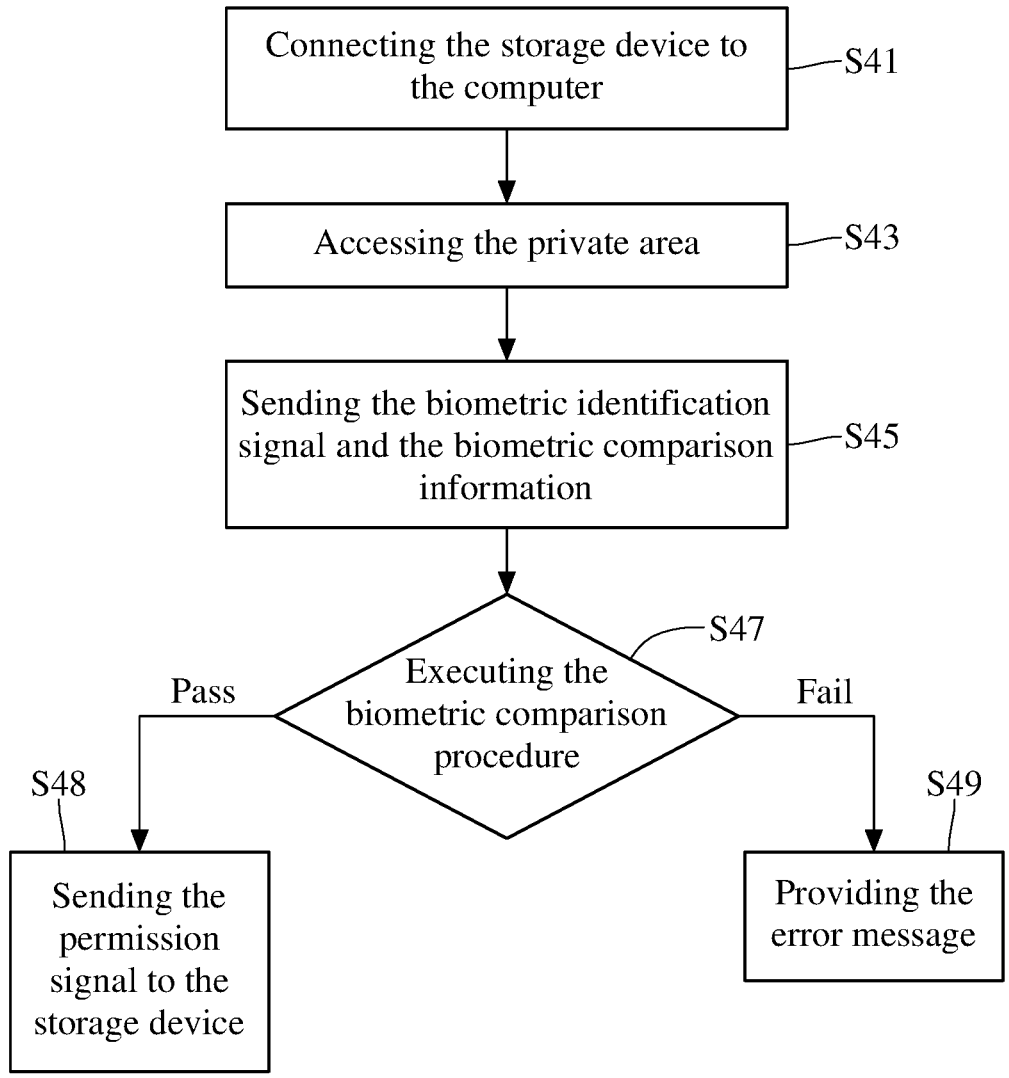
FIG. 4 is a flowchart of a private data accessing method for accessing a private area according to an embodiment of the present disclosure.

Please refer to FIG. 4, which shows a flowchart of a private data accessing method for accessing a private area according to an embodiment of the present disclosure, adapted to a computer with an operating system and a specified software installed therein. Please refer to the step S41. Specifically, the storage device 1 was connected to the computer with the operating system logged in and the user can perform data accessing operations in the operating system. In general, a GUI (Graphical User Interface) of the operating system can already show all storage sections of the storage device 1 at this time, these storage sections at least comprise a public area 52, and the storage device 1 allows the operating system to display the private area 54 in a text or image manner for the user to view in this embodiment. If the user tries to access the public area 52, the control module 40 generates an access signal directing toward the public area 52, and said access signal is generated according to the reading or writing operation sent from the operating system.

Please refer to the step S43 in FIG. 4. If the user tries to access the private area 54, the AP Tool invokes an API (Application Programmimg Interface) of WBF and asks the storage device 1 to send the biometric identification signal and the biometric comparison information, as shown in the step S45. After the control module 40 gets the biometric identification signal generated by the biometric module 30, the control module 40 sends the biometric identification signal together with the biometric comparison information to the operating system. Please refer to the step S47. The AP Tool invokes the operating system to execute the API of the WBF to perform the biometric comparison procedure after getting the biometric identification signal and the biometric comparison information. If the comparison passes, which means the user who tries to access the private area 54 has passed the fingerprint authentication and the operating system sends a permission signal to the control module 40 of the storage device 1, as shown in the step S48, the control module 40 generates an access signal directing toward the private area 54 accordingly, and then sends said access signal to the storage module 50 for the reading/writing operations afterwards. On the other hand, if the comparison fails, the operating system provides an error message as shown in the step S49. It should be mentioned that in this embodiment, the specified software, AP Tool, invokes the API of the operating system to implement the function of the fingerprint identification. In other embodiments, the AP Tool further comprises a middleware to directly communicate with the biometric module 30 in low-level hardware language and execute the same comparison procedure as the API previously did to access the private area 54.

In sum, the storage device with the biometric module of the present disclosure treats the biometric module and the control module as independent components connected in parallel, and the storage device collaborates with the specific software installed on the computer, so that the firmware of the control module does not need to be modified when the fingerprint module or the NAND flash chip has changed, thus reducing the developing time of integration and saving the unnecessary resource costs. The storage device of the present disclosure allows the user to log in the computer's operating system by the fingerprint identification, meanwhile the user can access the confidential data stored in the private area. By breaking the single function restriction from the conventional USB dongle and the fingerprint flash drive, the present of disclosure has improved the practicability and the convenience of the USB drive.

What is claimed is:

1. A storage device with a biometric module, comprising:
   a hub module with an external connection port and a plurality of internal connection ports;
   a first external transmission module electrically connecting to the external connection port, wherein types of transmission interfaces of the first external transmission module and the hub module are identical;
   a biometric module electrically connecting to one of the plurality of internal connection ports, wherein the biometric module is configured to perform biometric identification and to generate a biometric identification signal;
   a control module electrically connecting to an unoccupied one of the plurality of internal connection ports, wherein the control module is configured to obtain a permission signal and to generate an access signal accordingly, wherein the permission signal is associated with the biometric identification signal and a biometric comparison information; and
   a storage module electrically connecting to the control module, wherein the storage module comprises a public area and a private area, the control module sends the access signal directing toward the private area to the storage module when the control module receives the permission signal.

2. The storage device according to the claim 1, wherein the biometric identification comprising at least one of fingerprint, face, voice, iris, vein, retina, signature and DNA.

3. The storage device according to the claim 1, wherein the transmission interface of the biometric module is SPI, and the storage device further comprises an interface-converting module configured to convert an SPI signal to a signal of the transmission interface of the hub module.

4. The storage device according to the claim 1, wherein the storage module further comprises a biometric storage section configured to store the biometric comparison information and be accessible to the control module only.

5. The storage device according to the claim 1, wherein the storage module is NAND, V-NAND or NOR flash.

6. The storage device according to the claim 1, further comprising a second external transmission module having a type of a transmission interface identical to the type of the transmission interface of the hub module, wherein the second external transmission module comprises at least two transmission interfaces, one of the transmission interfaces electronically connects to another unoccupied one of the plurality of internal connection ports.

7. The storage device according to the claim 1, wherein the transmission interface is USB.

* * * * *